United States Patent
Camenisch et al.

(10) Patent No.: US 9,565,020 B1
(45) Date of Patent: Feb. 7, 2017

(54) SYSTEM AND METHOD FOR GENERATING A SERVER-ASSISTED STRONG PASSWORD FROM A WEAK SECRET

(71) Applicant: International Business Machines Corporation, Armonk, NY (US)

(72) Inventors: Jan L. Camenisch, Thalwil (CH); Franz-Stefan Preiss, Zurich (CH); Kai Samelin, Rueschlikon (CH); Dieter M. Sommer, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/013,119

(22) Filed: Feb. 2, 2016

(51) Int. Cl.
| | |
|---|---|
| *H04L 9/08* | (2006.01) |
| *H04L 29/06* | (2006.01) |
| *H04L 9/14* | (2006.01) |
| *H04L 9/32* | (2006.01) |

(52) U.S. Cl.
CPC ........... *H04L 9/0894* (2013.01); *H04L 9/0863* (2013.01); *H04L 9/14* (2013.01); *H04L 9/3242* (2013.01); *H04L 63/083* (2013.01)

(58) Field of Classification Search
CPC .................................................... H04L 9/0894
See application file for complete search history.

(56) References Cited

U.S. PATENT DOCUMENTS

| | | | | |
|---|---|---|---|---|
| 6,067,625 | A * | 5/2000 | Ryu .................. | G06F 21/31 726/18 |
| 6,360,322 | B1 * | 3/2002 | Grawrock ........... | G06F 21/31 380/255 |
| 6,668,323 | B1 * | 12/2003 | Challener ........... | G06F 21/31 380/286 |
| 6,829,356 | B1 | 12/2004 | Ford | |
| 6,978,385 | B1 * | 12/2005 | Cheston ............. | G06F 21/31 340/5.85 |
| 7,139,917 | B2 | 11/2006 | Jablon | |
| 7,359,507 | B2 | 4/2008 | Kaliski | |

(Continued)

OTHER PUBLICATIONS

O'Gorman; Comparing passwords, tokens, and biometrics for user authentication; Published in: Proceedings of the IEEE; (vol. 91 , Issue: 12 ); pp. 2021-2040; Date of Publication: Dec. 2003; IEEE Xplore.*

(Continued)

*Primary Examiner* — Bradley Holder
(74) *Attorney, Agent, or Firm* — Cantor Colburn LLP; David Quinn

(57) ABSTRACT

Disclosed herein is a method for generating a high entropy password using a low entropy password and low-entropy login data comprising supplying the low entropy password to a system comprising a generating client and/or a recovery client; and at least n servers; submitting request data derived, at least in part, from the user's low entropy password, where the request data includes authentication data; engaging in a distributed protocol with at least t servers to generate high-entropy values based on stored cryptographic information and a set of authentication information stored on the at least n servers which is checked against the authentication data provided by the user and/or the generating client and/or a recovery client; and generating the high entropy password.

6 Claims, 6 Drawing Sheets

(56) References Cited

U.S. PATENT DOCUMENTS

| | | | | |
|---|---|---|---|---|
| 7,809,130 | B1* | 10/2010 | Kalyadin | G06F 21/46 380/1 |
| 8,499,157 | B1 | 7/2013 | Juels | |
| 9,094,194 | B2* | 7/2015 | Kern | H04L 9/0894 |
| 9,245,143 | B2* | 1/2016 | Ingalls | G06F 21/6218 |
| 9,323,918 | B2* | 4/2016 | Shankaranarayanan | G06F 21/45 |
| 2004/0133812 | A1* | 7/2004 | Ohmori | G06F 21/31 726/18 |
| 2005/0223216 | A1* | 10/2005 | Chan | H04L 63/083 713/153 |
| 2006/0041932 | A1* | 2/2006 | Cromer | H04L 9/3226 726/6 |
| 2007/0157032 | A1* | 7/2007 | Paganetti | G06F 21/31 713/193 |
| 2007/0179903 | A1* | 8/2007 | Seinfeld | G06Q 20/12 705/67 |
| 2009/0241201 | A1* | 9/2009 | Wootton | G06F 21/31 726/28 |
| 2013/0174236 | A1* | 7/2013 | You | H04L 63/062 726/6 |
| 2013/0212367 | A1* | 8/2013 | Ingalls | G06F 21/88 713/2 |

OTHER PUBLICATIONS

Denning et al.; Exploring implicit memory for painless password recovery; Published in: Proceeding CHI '11 Proceedings of the SIGCHI Conference on Human Factors in Computing Systems; pp. 2615-2618; Year 2011; ACM Digital Library.*

A. Bagherzandi, S. Jarecki, N. Saxena, and Y. Lu. "Password-protected secret sharing." in ACM CCS, pp. 433-444, 2011.

D. Chaum Blind Signatures for Untraceable Payments. In CRYPTO, pp. 199-203, 1982.

Gosney, J. M. (2012). Password Cracking HPC. Passwords12. Oslo, Norway.

J. Alex Halderman et al. "A Convenient Method for Securely Managing Passwords" World Wide Web Conference, 2005, May 10-14, 2005, Chiba, Japan.

J. Camenisch, A. Lysyanskaya, and G. Neven. Practical yet universally composable two-server password-authenticated secret sharing. In ACM CCS, pp. 525-536, 2012.

M. J. Freedman, Y. Ishai, B. Pinkas, and O. Reingold Keyword Search and Oblivious Pseudorandom Functions in TCC, pp. 303-324, 2005.

S. Goldwasser, and R. Ostrovsky Invariant Signatures and Non-Interactive Zero-Knowledge Proofs are Equivalent (Extended Abstract) In Crypto, pp. 228-245, 1992.

S. Jarecki, A. Kiayias and H. Krawczyk "Round-Optimal Password-Protected Secret Sharing and T-PAKE in the Password-Only Model" In ASIACRYPT, pp. 233-253, 2014.

V. Boyko, P. D. MacKenzie, and S. Patel. Provably secure password-authenticated key exchange using Diffe-hellman. In Eurocrypt, pp. 156-171, 2000.

W. Ford, and B. S. Kaliski Jr. Server-Assisted Generation of a Strong Secret from a Password In WETICE, pp. 176-180, 2000.

* cited by examiner

SYSTEM AND METHOD FOR GENERATING A SERVER-ASSISTED STRONG PASSWORD FROM A WEAK SECRET

BACKGROUND

This disclosure relates to a system and to a method for server assisted strong password generation from a weak secret.

Passwords are still used as a means of authentication for online services such as, for example, e-mail, online-banking, social networks, and the like. In most cases, this is normally the only method that such services support and utilize as a means of authentication.

Since such passwords need to be remembered, many users either re-use passwords in different contexts or switch to password managers, also known as key-rings. The first approach is problematic in that corrupt servers acquire a knowledge of the used password(s), e.g., by waiting till the honest user logs in or by mounting online-attacks on the (salted) hashes stored in the database. If these passwords are re-used, the adversary can impersonate the user at a different service.

In order to tackle this problem, the second approach, key-rings are used. The keyring can store passwords and encryption keys for the user. They are protected with the user's login password and stored safely via encryption. Every time the user uses an application (e.g. Ubuntu One) for which the user has stored a password in the key ring, the key ring enters it for the user. While this second approach is advantageous in that one needs physical access to the key-ring data and to the key-ring account password it has several drawbacks: 1) if the encrypted key-ring is stolen, one can perform online-attacks on the key-ring; 2) if the key-ring is decrypted, every password is directly revealed; 3) if online-attacks on the key-ring need to be made infeasible, the password for the key-ring needs to have enough entropy, which makes the master-password virtually impossible to remember. Password entropy is a measure of how unpredictable a password is.

Existing methods of password protection therefore fall short in terms of providing the desirable user convenience and security guarantees. It is therefore useful to provide a method and a system for password protection that offers both substantial convenience and a better assurance of security than the existing approaches disclosed above.

SUMMARY

Disclosed herein is a method for generating a high entropy password using a low entropy password and low-entropy login data comprising supplying the low entropy password to a system comprising a generating client and/or a recovery client; and at least n servers; submitting request data derived, at least in part, from the user's low entropy password, where the request data includes authentication data; where a user enters the low entropy password into the generating client and/or recovery client; engaging in a distributed protocol with at least t servers to generate high-entropy values based on stored cryptographic information and a set of authentication information stored on the at least n servers which is checked against the authentication data provided by the user and/or the generating client and/or a recovery client; and generating the high entropy password where at least a threshold t≤n of the at least n servers contribute to generation of the high-entropy password.

Disclosed herein too is a method for retrieving a high entropy password from a system comprising a recovery client; and one or more servers; choosing a threshold t≤n, where t and n represent a number of servers; run $(pk_t, \{(pk_i, sk_i)\}_{0<i\le n}) \leftarrow \text{TKeyGen}(1^\lambda, t, n)$, from the recovery client to the one or more servers; where $pk_t$ is a public key, $pk_i$ is a private key and $sk_i$ is a secret key; dividing $pk_t$, $pk_i$, and $sk_i$ arbitrarily among the one or more servers; where each server receives a share of $pk_t$, $pk_i$, and $sk_i$; setting c=G(m), where c is password ciphertext, G is a hash function and m is a message; blinding ciphertext c where by setting c'=TEnc$(pk_t, 1)$; randomizing c"←c⊕c' in a homomorphic form; decrypting c" by applying a decryption share $(d_i, \pi_i) \leftarrow$ PDec$(sk_i, c")$; where c' is the blinding ciphertext and c" is the blinded ciphertext; sends $(d_i, \pi_i)$ from the server to the recovery client; where TKeyGen is an algorithm that outputs the public $(pk_t)$ and the private $(pk_i)$ key for each participant and the secret key $(sk_i)$ of a scheme, where λ is a security parameter, n∈N a number of particpants, t≤n∈N is a threshold given by $(pk_t, \{(pk_i, sk_i)\}_{0<i\le n}) \leftarrow \text{TKeyGen}(1^\lambda, t, n)$; where algorithm TEnc gets as input the public key $pk_t$, a message m∈M to encrypt, where m and M are both messages; and outputs a cipher-text c: c←TEnc$(pk_t, m)$, where algorithm PDec outputs a decryption share $d_i$, or a special symbol ⊥∉M if decryption failed, a proof $\pi_i$ that decryption was performed correctly with respect to a partial secret key $sk_i$ and the cipher-text c: $(d_i, \pi_i) \leftarrow$ PDec$(sk_i, c)$.

Disclosed herein too is a system comprising a generating client and/or recovery client in operative communication with a user; where the user provides a password to the generating client and/or recovery client; and a server; where the server is in operative communication with the generating client and/or recovery client; and where the generating client and/or recovery client generates a RSA-key pair (d,(N,e)), where d, N and e represent integers and where the relationship between d, N and e is given by equation (1):

$$(d)e \equiv 1 \bmod \phi(N) \tag{1},$$

splits up the integer d into a plurality of key-shares; assigns a portion of each key-pair share $d_i$ to the one or more servers as seen in the Equation (2); where n is an integer that represents a number of servers;

$$(d_1 d_2 d_3 \ldots d_n)e \equiv 1 \bmod \phi(N) \tag{3},$$

where $d_i$ is a share of the $i^{th}$ server; where n is an integer that represents the number of servers; sends initial data that is derived from the low entropy password PW, the RSA-key pair, a salt k, and an optional "id" from the generating client and/or recovery client to the one or more servers; where initial data is represented by Equation (4)

$$id, h_1 = H(k, PW, S_1)d_1, N \tag{4},$$

and computes a bit string $(N, e, d_i, id)$ which provides the high entropy password; where the bit string is computed by the at least n servers, or a combination of the one or more of the at least n servers, the generating client and/or the recovery client.

Disclosed herein too is a system for retrieving a high entropy password comprising a generating and/or a recovery client; and one or more servers; where the generating and/or recovery client chooses a threshold t≤n, where t and n represent a number of servers; transmits $(pk_t, \{(pk_i, sk_i)\}_{0<i\le n}) \leftarrow \text{TKeyGen}(1^\lambda, t, n)$ to the one or more servers; where $pk_t$ is a public key, $pk_i$ is a private key and $sk_i$ is a secret key; distributes $pk_t$, $pk_i$, and $sk_i$ arbitrarily among the one or more servers; where each server receives a share of $pk_t$, $pk_i$, and $sk_i$; sets c=G(m), where c is a ciphertext, G is a hash function and m is a message; blinds ciphertext c where by setting c'=TEnc($pk_t$,1); randomizes c"←c⊕c' in a homomorphic form; decrypts c" by applying a decryption share ($d_i$,$\pi_i$)←PDec($sk_i$,c"); where c' is the blinding ciphertext and c" is the blinded ciphertext; sends ($d_i$,$\pi_i$) from the server to the generating and/or recovery client; where TKeyGen is an algorithm that outputs the public ($pk_t$) and the private ($pk_i$) key for each participant and the secret key ($sk_i$) of a scheme, where λ is a security parameter, n∈N a number of particpants, t≤n∈N is a threshold given by ($pk_t$,{($pk_i$,$sk_i$)}$_{0<i≤n}$)←TKeyGen($1^λ$,t,n); where algorithm TEnc gets as input the public key $pk_t$, a message m∈M to encrypt, where m and M are both messages; and outputs a cipher-text c: c←TEnc($pk_t$,m), where algorithm PDec outputs a decryption share $d_i$, or a special symbol ⊥∉M if decryption failed, a proof $\pi_i$ that decryption was performed correctly with respect to a partial secret key $sk_i$ and the cipher-text c, ($d_i$,$\pi_i$)←PDec($sk_i$,c); where algorithm TDec outputs a high-entropy value m on input of t correctly calculated decryption shares, m←TDec({$d_i$}$_{0<i≤t}$).

DETAILED DESCRIPTION

Disclosed herein is a method and a system that permits a user to derive high-entropy passwords by using online servers that employ oblivious cryptographic mechanisms, such as, for example, blind computation. The method comprises combining a user-provided low entropy master password for authenticating the user with a bit-string generated by a plurality of computer servers to securely generate high-entropy passwords that can be used in online services (e.g., e-mail, online-banking, social networks, and the like) employed by the user.

In an exemplary embodiment, the method comprises generating a high entropy password by supplying the low entropy password to a system comprising a generating client and at least n servers. The servers in conjunction with the generating client generate the high entropy password for the user, where at least a threshold t≤n of the at least t servers contribute to generation of the high-entropy password, using the low-entropy password to authenticate the user and cryptographic information stored on the servers. The user supplies the low entropy password to the generating client which engages in a distributed protocol with the at least t servers to generate high-entropy values based on stored cryptographic information and a set of authentication information stored on the at least n servers.

This method is advantageous in that the online servers contribute to password "generation". The generated passwords are strong having high entropy values, and, in addition the servers do not learn the generated passwords and therefore a hacker penetrating the server will not get to know them either. The use of this method does not make use of any additional setup. Employing this method enables the user to avoid using a key-ring and thus prevents the problems associated with using a key-ring, some of which are listed above. There is no longer a need for a single trusted entity and a large number of passwords may be "stored" using the disclosed method.

Figure 1:
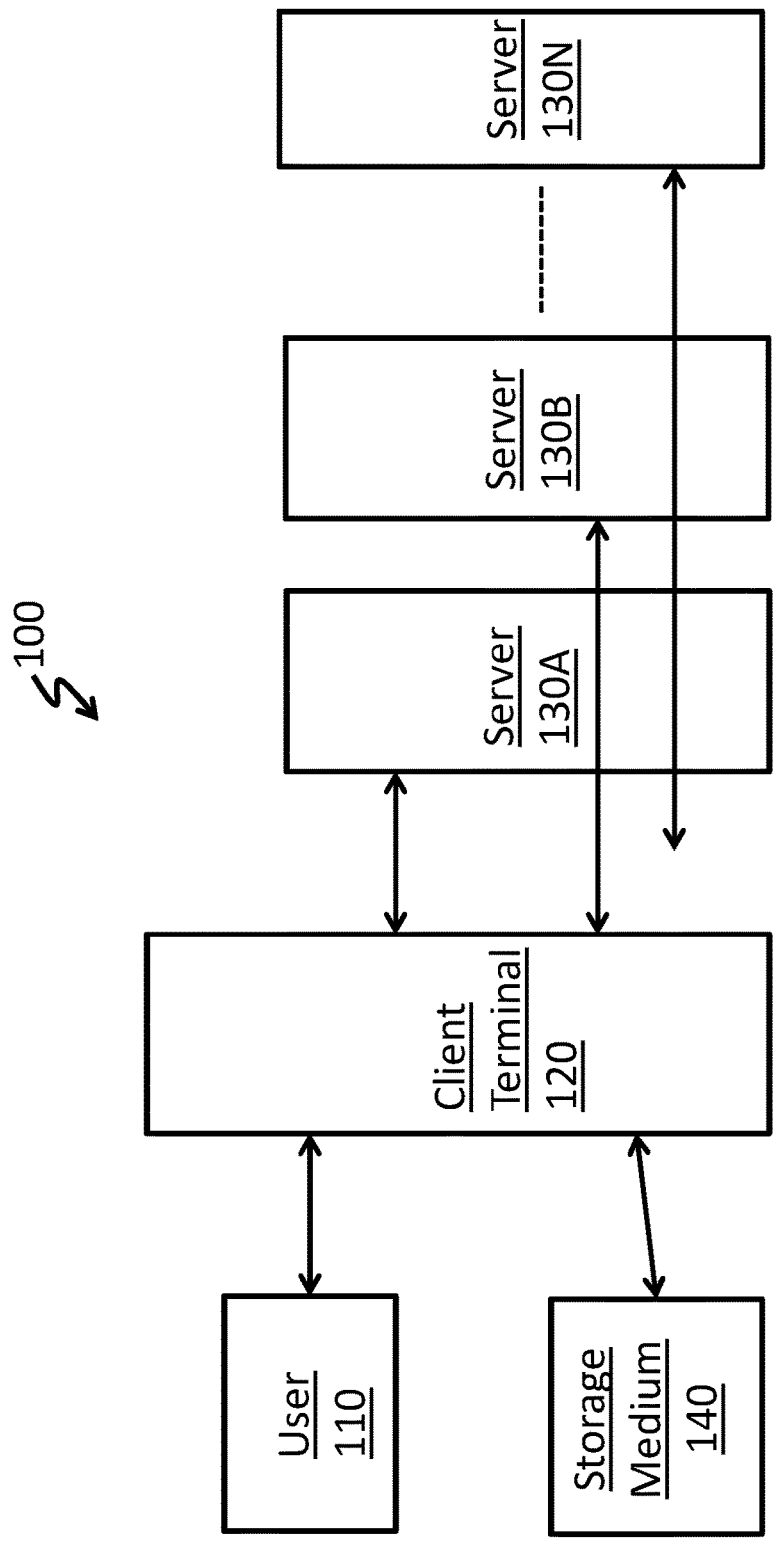
FIG. 1 is a block diagram illustrating an initializing system for generating a high entropy password.
Figure 2:
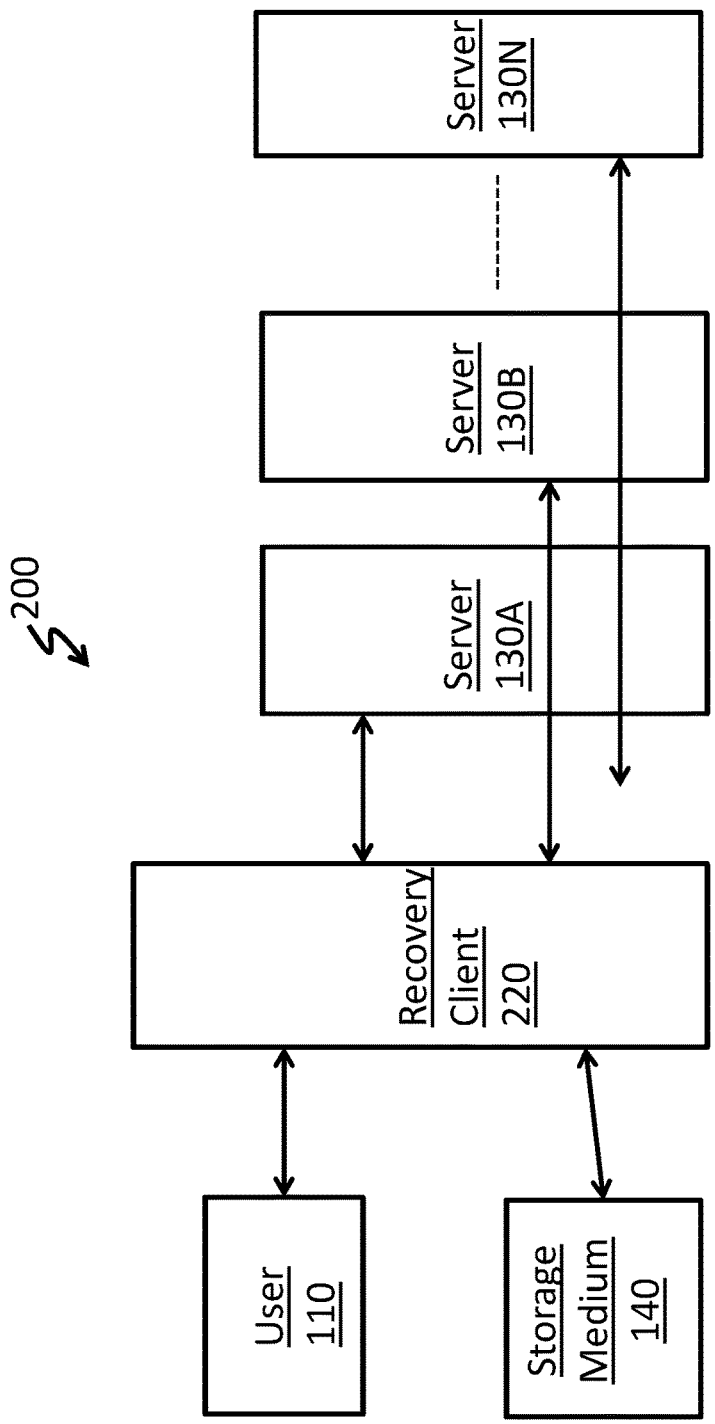
FIG. 2 is a block diagram illustrating a recovery system for recovering the high entropy password.

FIGS. 1 and 2 are block diagrams illustrating systems 100 and 200 in accordance with the present invention where system 100 is referred to as an "initializing system" and system 200 is referred to as a "recovery system." Initializing system 100 includes a user 110, a client terminal 120, a number of servers 130a-130n (collectively, servers 130) and optionally also a storage medium 140. The user 110 may be an individual, a group of individuals, a legal entity such as a corporation, a computer, or the like. Client terminal 120, which shall be referred to as the "generating client" 120, is typically some type of computer-based device. Examples include personal computers, computer workstations, and digital wireless phones. Servers 130 typically are also computer-based devices. In this description, they are referred to as "servers" because of the role that they play but this terminology is not meant to imply that they are necessarily server-class computers. At least one and possibly all servers 130 are secret holding servers. The role played by secret holding servers will be described more fully below. In certain embodiments, there may be a single server 130. Alternate embodiments prefer two or more secret holding servers 130. In embodiments which utilize multiple secret holding servers 130, the secret holding servers preferably are controlled by different entities so that no individual entity has access to all of the secret holding servers 130, for reasons discussed below. Examples of storage medium 140 include a network disk drive, a directory service, or a file server. The user 110, servers 130, and storage medium 140 are each coupled to the generating client 120. The connections may be made by any number of means, including over computer networks such as the Internet or by wireless connections. The connections need not be permanent or persistent. In fact, as will be described further below, generating client 120 performs a particular task and once that task is completed, there is no need for the other components to communicate further with generating client 120.

Recovery system 200 is similar to initializing system 100, except that generating client 120 is replaced by another client terminal 220, which shall be referred to as the recovery client 220. Recovery client 220 may or may not be the same physical device as generating client 120. Examples of recovery clients 220 include personal computers, digital kiosks, digital wireless phones or other wireless devices, and smartcards.

Systems 100 and 200 implement the following functionality. User 110 has high entropy password data which he/she would like to be able to use from recovery client 220, where "strong" implies data that cannot feasibly be deduced by exhaustive guessing and "secret" means data that nobody other than the secret holder (e.g., the user in the case of the user's high entropy password data) should feasibly be able to determine. However, recovery client 220 is a client terminal which cannot or does not have access to user 110's high entropy password data a priori. Furthermore, user 110 does not directly know his high entropy password data so, for example, user 110 cannot simply input his high entropy password data into the recovery client 220. Hence, recovery client 220 must somehow regenerate or recover user 110's high entropy password data and it must do so in a secure fashion in order to maintain the strong secrecy of the data. User 110 knows certain weak secret data, where "weak" implies that the data can be correctly guessed within a moderate number of tries. For example, it may be a user-specified password. User 110 enters his weak secret data into recovery client 220 and, based on user 110's weak secret data, system 200 then securely recovers the high entropy password data, thus permitting user 110 to use his high entropy password data from recovery client 220. System 100 and generating client 120 perform various initialization steps based on the high entropy password data and the weak secret data, so that system 200 and recovery client 220 may later securely recover the high entropy password data from the user 110's weak secret data. Servers 130 assist in these processes.

Figure 3:
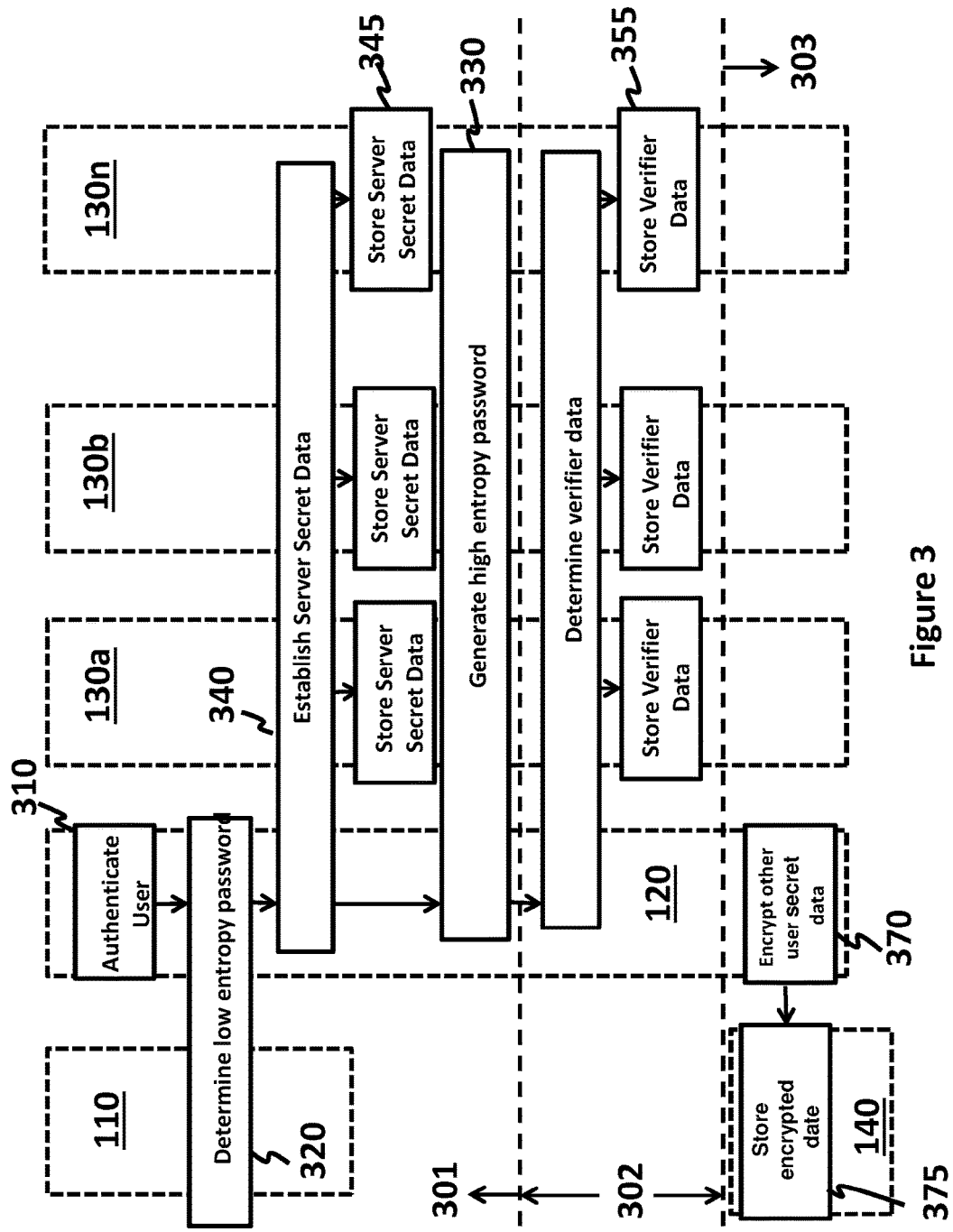
FIG. 3 is a schematic exemplary diagram that illustrates a method for performing an initialization of the system for generating and recovering the high entropy password data from a user's weak secret data.
Figure 4:
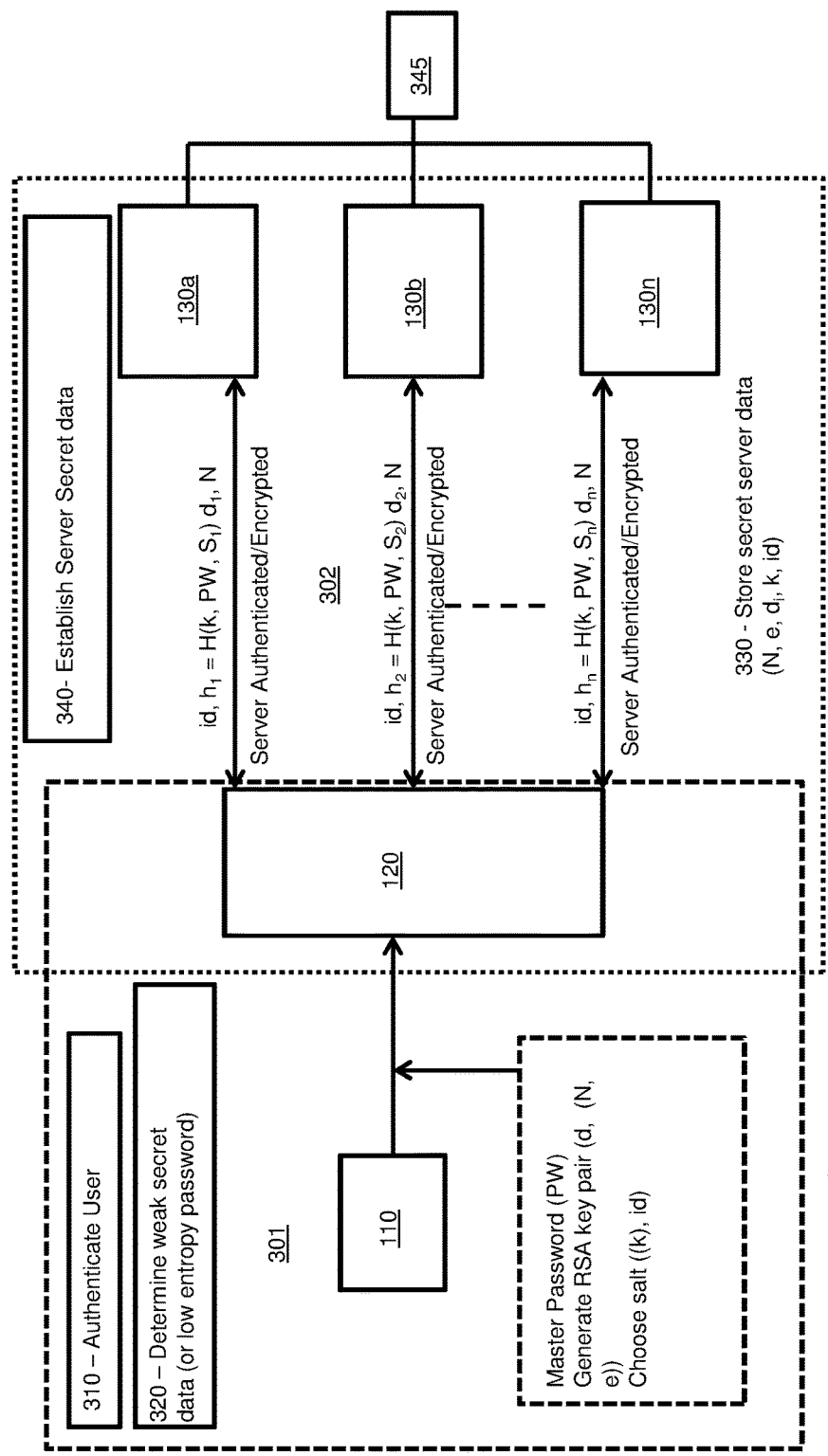
FIG. 4 is a schematic exemplary diagram that illustrates a method for performing an initialization of the system for generating the high entropy password data from the user's weak secret data.

FIGS. 3 and 4 are schematic diagrams that illustrate exemplary methods 300 and 400 for performing an initialization of system 100 for recovering the high entropy password data from user 110's weak secret data, respectively. It is to be noted that the FIGS. 3 and 4 are directed only to the initialization (i.e., the set-up) for generating the high entropy password.

Method 300 uses system 100 and method 400 uses system 200. Each of the dashed boxes 110, 120, 130, 140, and 220 represents one of the components of system 100 or system 200. The solid boxes represent various steps in the two methods 300 and 400. The location of a solid box within a dashed box generally indicates that that specific step is performed by that specific component. For example, in FIG. 3, step 310 is located within the dashed box for generating client 120. This generally indicates that generating client 120 performs step 310. The methods are preferably implemented by software running on the various components within each system, possibly assisted by hardware modules, but the processing modules depicted in FIGS. 3 and 4 can also be implemented in hardware and/or firmware.

With reference now to the FIGS. 3 and 4, the user 110 uses a low entropy password PW (also termed weak secret data) to authenticate himself/herself (hereinafter himself) to the generating client 120 and/or the servers 130. In an exemplary embodiment, the user 110 uses the low entropy password PW to authenticate himself/herself (hereinafter himself) to the servers 130. In the FIG. 3, the initializing method 300 may be broken down into three general stages 301-303. In the generation stage 301, the system 100 generates the user's high entropy password from stored cryptographic material, i.e., the servers' secret data, additional low-entropy login data from the user and verifies that the correct password was entered by the user. In an optional verifier setup stage 302, system 100 executes steps which allow system 200 to verify the subsequent successful recovery of the high entropy password. In the storage stage 303, system 100 uses the high entropy password to encrypt private data for the user (e.g., the user's private key or digital certificate), for later recovery by recovery client 220. It is to be noted that not all implementations will utilize all stages 301-303, but they are included in this example to illustrate various aspects of the invention.

The FIG. 4 depicts a preferred embodiment of the FIG. 3, where only two steps 301 and 302 are performed. Both the FIGS. 3 and 4 will be detailed in the following discussion.

Steps 310 and 320 can be merged into a single step but are shown here as two different steps because they may be performed by a single entity—the user 110 or by combined efforts of both entities—the user 110 and the generating client 120.

In one embodiment, the user 110 provides password PW to the generating client 120 which then authenticates the user 110. This would occur only in a single step 310. The password is typically a low entropy user password in this embodiment, and this description will characterize it as such. However, the password could take other forms and/or be wholly or partially from another source, such as biometric signature data and/or data stored in a physical token or device associated with the user 110. In the FIGS. 3 and 4, generation of the low entropy password is shown as covering both the user 110 and generating client 120. As seen in the FIG. 4, this event may require collaboration of steps 310 and 320 because it entails cooperation between the user and the generating client 320. This is because either may participate to various degrees, depending on the specific implementation. For example, in one approach, the user 110 proposes a password PW and the generating client 120 either accepts or rejects the password, depending on whether it meets certain anti-guessing criteria. In a different approach, the generating client 120 generates the password PW (for example, using a random process) and then assigns it to the user 110. In any event, at the end of step 320, both the user 110 and generating client 120 have access to the password PW.

The generating client 120 contacts and authenticates itself to two or more servers 130a, 130b, 130n, where n is an integer having values of 2 or more, preferably 3 or more, preferably 4 or more and preferably 5 or more. In an embodiment, n can have integer values of up to 100 if so desired. It is to be noted that if the user 110 keeps a share for himself (this is discussed below), then the number of servers used "n" can be 1 or more. In an embodiment, n can be 2 or more even if the user keeps a share for himself. In an exemplary embodiment, the share referred to here is the RSA-key pair share which is detailed below.

The authentication of the generating client 120 with the plurality of servers 130 to store data 330 from the initialization processes 310 and 320 may be accomplished in different ways. In one embodiment, this may be accomplished by the generating client 120 using a RSA-key pair. The generating client 120 generates an RSA-key pair $(d,(N, e))$, where d, N and e represent integers and where the relationship between d, N and e is given by equation (1) which are variations on one another:

$$(d)e \equiv 1 \, mod \, \phi(N) \tag{1}$$

The generating client 120 also generates a salt (k) and a unique identifier identity (id). The salt is random data that is used as an additional input to a one-way function that hashes a password or passphrase. The primary function of salts is to defend against dictionary attacks versus a list of password hashes and against pre-computed rainbow table attacks. In some embodiments, the salt or identity "id" may not be used, i.e. they are optional.

The generating client 120 may further split up the integer d into key-shares, and arbitrarily assign a portion of each key-share $d_i$ to each of the plurality of "n" deployed servers such that the equation (1) becomes equation (2) shown below:

$$(d_1 d_2 d_3 \ldots d_n)e \equiv 1 \, mod \, \phi(N) \tag{2}$$

Each of the "n" servers may retrieve exactly one share. Optionally, the user may keep one share for himself to prevent the "n" servers from generating the signature on their own (e.g., if all servers are corrupted). The user may keep the key-share for himself, id and the salt k can, for example, be stored locally, or using a PASS-scheme. Password-authenticated secret sharing (PASS) schemes allow users to distribute data among several servers so that the data can be recovered using a single human-memorizable password, but no single server (or collusion of servers up to a certain size) can mount an offline dictionary attack on the password or learn anything about the data.

Another way of generating the key-shares is to use multi-party computation generation techniques to avoid that all key-shares are at some point pooled together or let the servers have their own key-shares. In other words, in equation (1) above it is also plausible for the large positive integers "e" and/or "N" and/or each "di" to alternatively be distributed between servers or alternatively, between the servers and the user. This protocol of using distributed values can therefore be easily adjusted if desired to prevent attacks on the system.

With reference now again to the FIG. 4, the generating client 120 initializes the "n" servers as part of establishing server secret data 340. In an embodiment, the initialization is conducted using an encrypted hash (H) that comprises the password PW, a server ID, the salt, and the "id" and an RSA key share. Hash algorithms are one way functions. They turn any amount of data into a fixed-length "fingerprint" that cannot be reversed and also have the property that if the input changes by even a tiny bit, the resulting hash is completely different and appears random. This is useful for protecting passwords, because it is desirable to store passwords in a form that protects them even if the password file itself is compromised if the salt is not known, but at the same time, lends itself to being able to verify that a user's password is correct.

The encrypted initial data containing the hash is transmitted from the generating client 120 to the servers 130 (along with the other parameters such as the key share $d_i$, id, N and e) for purposes or authentication and determining server secret data 340 are given by the equations (4) to (6) below. For the first server 130a, the initial data transmitted from the generating client 120 to the server 130a may be represented as:

$$id, h_1 = H(k, PW, S_1) d_1, N \qquad (4),$$

while for the second server 130b, the hash algorithm may be represented as:

$$id, h_2 = H(k, PW, S_2) d_2, N \qquad (5),$$

and for the $n^{th}$ server 130n, the hash algorithm may be represented as:

$$id, h_n = H(k, PW, S_n) d_n, N \qquad (6).$$

The transmission of the initial data from the generating client 120 to the servers 130 for purposes or authentication and determining server secret data 340 may be conducted either sequentially or simultaneously. In an embodiment, the transmission between the generating client 120 and the servers 130 is conducted sequentially. After server 130a authenticates the transmission from the generating client 120, server 130b receives its transmission and authenticates it, and so on, until the $n^{th}$ server performs its authentication.

Server secret data 340 comprising one or more of N, e, $d_i$, id, and $h_i$ for the user 110 is established for one or more of the n servers. The servers 130 for which server secret data is established may be referred to as secret holding servers. In FIGS. 3 and 4, step 340 is shown as covering the generating client 120 and the servers 130 because each may participate to various degrees, depending on the specific implementation, as will be described further below. If a specific implementation calls for the generating client 120 and servers 130 to exchange messages in order to establish server secret data 340, it is important that these messages be integrity protected and the source of each message be authenticated in order to maintain the security of the overall protocol. For example, the generating client and the servers 130 might exchange messages over a secure channel. At the end of step 340, each server 130 has access to its corresponding server secret data $(N, d_i, id, h_i)$ and typically will also securely store 345 it for future use in generating the high entropy password. The high entropy password is based at least in part on a user unique identity (id) and a potential identity of the server service, e.g., the domain, and a login name $U_{id}$.

The generating client 120 may also have access to the server secret data, depending on the specific implementation. However, in this case, it typically would use the server secret data only as part of the initialization 300 and then would erase it. The generating client 120 does not retain the server secret data for future use.

With reference again to the FIGS. 3 and 4, the system now stores data 330 $(N, d_i, id, h_i)$ obtained from the initialization process. Step 330 covers both the generating client 120 and the servers 130 because, depending on the implementation, each may contribute to the storage process.

The generation of the high entropy password may now be conducted by one or more methods. In one method, the generation of the high entropy password may be accomplished by generating blind signatures, by using an oblivious pseudorandom function or threshold decryption systems. In generating passwords used for online services that are accessed by the user, the system blindly generates a derived value of the server secret data and possibly some user input. All information is then gathered at the client, potentially further processed and can then be used as a password for the given service. As the computations on the server-side are done "blindly", the servers do not learn any information about the final password. Each server's secret is not re-constructible from the output the servers provide. Finally, the user can further post-processes the values, i.e., to truncate the output. As an example for such "blind functions" are blind signatures and oblivious pseudorandom functions.

A blind signature is a form of digital signature in which the content of a message is disguised (blinded). The resulting blind signature can be publicly verified against the original, unblinded message in the manner of a regular digital signature. Blind signatures can also be used to provide unlinkability, which prevents the signer from linking the blinded message he signs to a later un-blinded version and the corresponding signature that he may be called upon to verify. In this case, the signer's response is first "un-blinded" prior to verification in such a way that the signature remains valid for the un-blinded message. This is useful in schemes where anonymity is desired.

Blind signature schemes can be implemented using a number of common public key signing schemes, such as for example RSA and DSA. To create such a signature, the message is first "blinded", typically by combining it in some way with a random "blinding factor". The blinded message is passed to a signer, who then signs it using a signing algorithm. The resulting signature/message pair can be later verified against the signer's public key. In the present invention, a plurality of distributed unique blind signatures can be used because the auxiliary information is blindly signed by the servers 130. This occurs because of the use of "n" servers and the distribution of the RSA-key shares amongst these servers. Each server therefore provides a blind signature that may be used for generating the high entropy password.

A traditional RSA signature is computed by raising the hash of a message m to the secret exponent d modulo the public modulus N. The blind version uses a random value r, such that r is coprime with N (i.e., gcd(r,N)=1). The value r is raised to the public exponent e modulo N, and the resulting value $r^e$ mod N is used as a blinding factor. The author of the message (in this case the generating client 120) computes the product of the message and blinding factor, as shown in equation (7)

$$m' = mr^e (modN) \quad (7)$$

and sends the resulting value m' to the signing authority. It is to be noted that the meaning of terms m, r, e and N are detailed in equation (1) above. Because r is a random value and the mapping $r \rightarrow r^e(modN)$ is a permutation, it follows that $r^e(modN)$ is random too. This implies that m' does not leak any information about m. The signing authority then calculates the blinded signature s' as shown in equation (8)

$$s' \equiv (m')^d (modN) \quad (8)$$

s' is sent back to the author of the message, who can then remove the blinding factor to reveal s, the valid RSA signature of m as shown in equation (9)

$$s \equiv s'r^{-1}(modN) \quad (9).$$

In the present case, let blind signature BSIG=(Gen,Verf, <U,S>) where S is the signer and U is the user, <U,S> the signing protocol between user U and signer S, "Verf" is verify, "Gen" is generate.

Then $(pk,sk) \leftarrow Gen(1^\lambda)$ generates a key-pair, where "pk" is the public key and "sk" is the secret signing key.

$d \leftarrow Verf(pk,s,m)$ verifies a signature "s" with respect to the public key "pk" and m is the message.

$s \leftarrow <U(pk,m),S(sk)>$ is a protocol between the signer S and a user U which outputs a signature "s" on m to U. S gains no information about the signature s or the message m signed.

Gen outputs a standard RSA-key pair, i.e., N=pq, where p≠q are two random distinct primes along with d as the private key and e as part of the public key "pk"

$$ed \equiv 1 mod \phi(N)$$

Verf(pk,s,m) outputs 1, if 0<s<N and $s^e \equiv H(m)modN$, where H is a random oracle mapping arbitrary length bit-strings to elements of $Z^*_N$, where $Z^*_N$ is the multiplicative group mod N.

In one manner of proceeding to generate a blind signature, <U(pk,m),S(sk)> proceeds as follows: the user chooses m and computes $h \leftarrow H(m)$. It then computes $m' \leftarrow hr^e(modN)$, where r is a random number coprime with N. The signer on inputting m' then computes $s' \leftarrow m'^d(modN)$. The user then calculates $s \equiv s'r^{-1}(modN)$, where s is now a standard RSA signature on m.

Another method of generating a derived value of the server secret data is to use an oblivious pseudorandom function (OPRF). A pseudorandom function (PRF) is an efficient (i.e. computable in polynomial time) deterministic function that maps two distinct sets (domain and range). The PRF has only one input d (domain) and a hidden random seed (range) which when run multiple times with the same input, always outputs the same value. Nonetheless, given an arbitrary input the output looks random due to the random seed. A PRF is considered to be good if its behavior is indistinguishable from a true random function. Therefore, given a true random function and a PRF, there should be no efficient method of determining if the output was produced by a true random function or the PRF.

An oblivious pseudorandom function allows evaluating a PRF in an oblivious manner, i.e., the server has the secret key k on which it blindly evaluates the PRF, i.e., the server learns nothing, while the user only learns the outcome of the PRF, and nothing else. The evaluation also outputs a proof π which allows the user to verify that the server computed the value correctly. In a nutshell, an OPRF is a two-party protocol P which on input (v,k) outputs (f(k,v),⊥), where the first element in the list represents the input/output of the user, while the second element corresponds to the server's input/output and where ⊥ means "nothing" or "error" or "exception". The protocol followed for an oblivious pseudorandom function case is similar to that of the blind signature case listed above.

In order to generate the high entropy password for a service X (which may be a URL) with username u, the generating client 120 lets m←(X,Uid) and logs into each server using its master-password. Simplified, the protocol proceeds as depicted in the FIG. 4 as follows, and will be detailed below:

i) Choose a random integer r, co-prime to N.
ii) Let $s_0 \leftarrow H(m)r^e modN$
iii) Send $s_0$ to the first server 130a from the generating client 120. It will calculate $s_1 \leftarrow s_0^{d_1} modN$ and sends this signature $s_1$ (also referred to above as an authentication) to the generating client 120. It is to be noted that $s_1$ represents the blinded signature from the first server 130a;
iv) Send $s_1$ to the second server 130b. It will calculate $s_2 \leftarrow s_1^{d_2} modN$ and sends this signature $s_1$ to the generating client 120.
v) Continue doing so, till $s_n$ has been generated.
vi) Calculate $s = s_n r^{-1} modN$, where s is the high entropy password and where the user may add his own share.

Correctness can be verified by inspection. Additional details of a possible verification process are detailed below.

The user 110 in conjunction with the recovery client 220 generates $h'_1 = H(s_0, H(k, PW; S_1))$, and sends $(id, h'_1, s_0)$ to the first server 130a, where $s_0$ is generated as discussed above. The server 130a checks that $h'_1 = H(s_0, h_1)$. After server 130a returns $s_1$, the user 110 in conjunction with the recovery client 220 generates $h'_2 = H(s_1, H(k, PW; S_2))$, and sends $(id, h'_2, s_1)$ to the second server 130b. The server 130b checks that $h'_2 = H(s_1, h_2)$. This continues until $s_n$ has been generated. Recovery client 220 will then generate s as described above.

In an embodiment, the servers 130 can refuse to participate in the signing request. This can, for example be, if too many failed login attempts are registered by the user 110 and/or the generating client 120, e.g., if the equality of the hashes does not hold. The final signature s can now be used on the service X as the high-entropy password. Its validity can also be checked using the public key (N,e) and m at the generating client 120. The final signature s can then be used as the password if a canonical mapping to the bit-string is utilized, an additional hashing step is utilized, or by using a deterministic randomness extractor to "truncate" the signature s into a reasonable length password, if, e.g., the signature is too long to be used as a password or the service X imposes additional restrictions on the password.

With reference now once again to the FIG. 3, details of verification of the high entropy password are provided. The verification set up stage 302 is an optional stage. In the verifier setup stage 302, verifier data is determined 350 for some and perhaps all of the n servers 130 and preferably is also stored by each server 130. The verifier data enables the servers 130 to verify whether a recovery client 220 (See FIG. 5) has successfully recovered the high entropy password. In an embodiment, the servers can either participate or refuse to do so. In a preferred embodiment, the servers used in the verification process may be the same as those used in the high entropy password generation process, although this does not have to always be the case.

In the storage stage 303, the generating client 120 additionally encrypts 370 other data for the user, which shall be referred to as the user's private data. In a preferred embodiment, the high entropy password may be used as a cryptographic key in a cryptosystem. The cryptosystem may by symmetric or asymmetric. For example, the private data could be the user's private key, a secret shared by the user and an application server, the user's credit card account numbers or other private or secret data which the user would like to use from the recovery client 220. The encrypted private data EPD is stored 375 in storage medium 140 for later recovery. Storage medium 140 typically is widely accessible; the user's private data is secured because it is stored in encrypted form. In alternate embodiments, the high entropy password may be used in other ways to securely store the user's private data.

Figure 5:
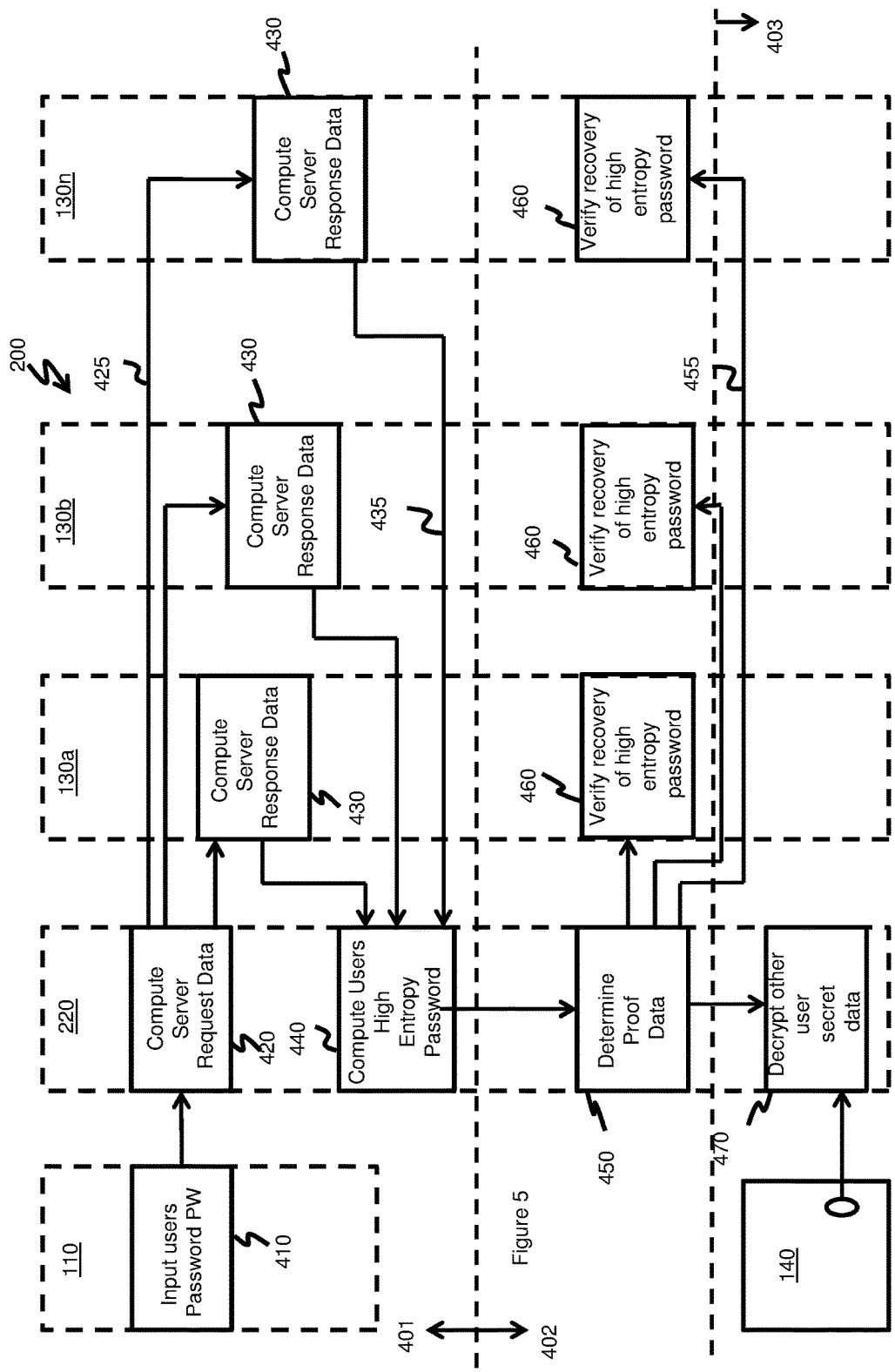
FIG. 5 is a schematic exemplary diagram that illustrates a method for performing a recovery of the high entropy password data.

Referring now to the FIG. 5, the recovery method 400 may also be broken down into three general stages 401-403 corresponding to stages 301-303 of method 300, not all of which may be used in all implementations. In stage 401, the recovery client 220 recovers the user's high entropy password, with the assistance of servers 130. In stage 402, one or more servers 130 determine whether the recovery client 220 has successfully recovered the high entropy password. In stage 403, the recovery client 220 also recovers the user's private data stored in storage medium 140. Again, the example method 400 is selected in order to illustrate various aspects of this disclosure, not all of which are needed to practice the invention. In an embodiment, the recovery client 220 may be the same as the generating client 120.

The recovery client 220 recovers 401 the user 110's high entropy password as follows. The user 110 inputs 410 his password PW to the recovery client 220. The recovery client 220 computes 420 server request data for each of the plurality of servers 130. The server request data is a function of password PW and other information detailed (k,d,N) above such that the output of the function does not reveal information about the low entropy password PW to a party that does not know the other information. In response to the received server request data, each server 130 computes 430 server response data, which is a function of the server request data and of the server's secret data, and transmits 435 the server response data back to the recovery client 220. The recovery client 220 then computes 440 the user's high entropy password as a function of the received server response data. As described previously, the high entropy password is a function of the user's additional low-entropy login data and of the server secret data. The recovery client 220 has direct access to the user's low entropy password PW but does not have direct access to the server secret data. However, the server response data contains a dependency on the server secret data; so the recovery client 220 has indirect access to the server secret data and can recover the user's high entropy password without requiring direct access to the server secret data.

In recovery stage 403, recovery client 220 retrieves 475 the user's encrypted private data EPD and decrypts 470 it using the recovered high entropy password. In this way, recovery client 220 also recovers the user's private data, such as the user's private key.

At the end of the period of legitimate use of high entropy password and any other recovered private data (e.g., at the end of the user's on-line session using the recovery client 220), the copy of the high entropy password and the other recovered private data in the recovery client 220 preferably are destroyed.

In the verification stage 402, the recovery client 220 determines 450 proof data for proving to at least two or more servers 130 that the high entropy password data was successfully recovered by the recovery client 220. The proof data is transmitted 455 to each of the servers 130. Each server 130 can then verify 460 whether this particular instantiation of the regeneration process 400 successfully recovered the user's high entropy password and can take appropriate actions. For example, in one embodiment, the server 130 might be responsible for a portion of the process of generating a digital signature on behalf of the user 110. In this case, the proof data may be accompanied by a message digest of the user-originated message to be digitally signed. Upon verification of the proof data, the server 130 generates its component of the digital signature and transmits this back to the client. The client determines the full digital signature based on the components which it receives.

Different types of verification may be used. In one approach which uses static verifier data, the verifier data is a one-way function of one or more data items that include the high entropy password. The verifier data is computed by the generating client 120 or some other trusted party and is sent to and stored at each server 130 as part of the initializing process 300. Preferably, different verifier data is computed for each server 130, for example, by applying a hash function to a data string comprising the high entropy password concatenated with a unique but non-secret identifier for the particular server 130. In verification stage 402, the recovery client 220 computes 450 the proof data by re-computing the same one-way function of the regenerated high entropy password data. If the proof data computed by the recovery client 220 matches the verifier data stored by the server, then recovery of the high entropy password data is verified.

Figure 6:
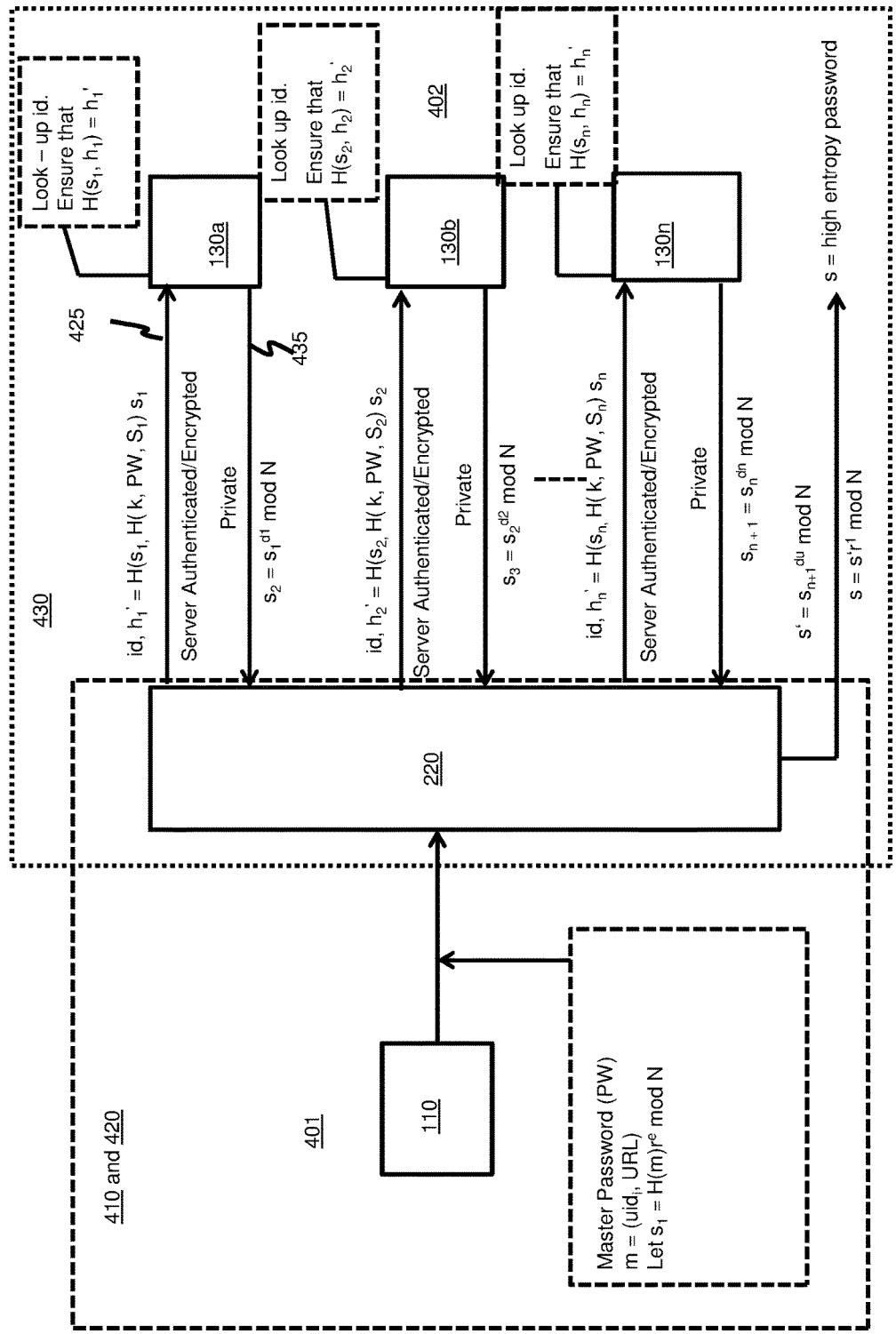
FIG. 6 is a schematic exemplary diagram that illustrates a method for performing a recovery of the high entropy password data.

The FIG. 6 depicts a preferred embodiment of the FIG. 5. The FIG. 6 depicts the case involving a RSA-key share. In recovering the password, the system 200 depicted in the FIGS. 5 and 6 deploys semantically secure homomorphic threshold encryption programs. These semantically secure homomorphic threshold encryption programs comprise one or more of the following algorithms.

a) TKeyGen (ThresholdEncryptionSchemeKeyGeneration): The algorithm TKeyGen outputs the public key ($pk_t$) for the scheme and public ($pk_i$) keys for each participant and the secret key ($sk_i$) for each participant of the scheme, where $\lambda$ is the security parameter, $n \in N$ the number of participants, $t \le n \in N$ be the threshold:

$$(pk_t, \{(pk_i, sk_i)\}_{0 < i \le n}) \leftarrow TKeyGen(1^\lambda, t, n)$$

b) TEnc (ThresholdEncryptionSchemeEncryptionAlgorithm): The algorithm TEnc gets as input the public key $pk_t$, the message $m \in M$ to encrypt, where M the message space. It outputs a cipher-text c:

$$c \leftarrow TEnc(pk_t, m)$$

c) PDec (Partial Description): The algorithm PDec outputs a decryption share $d_i$, or a special symbol $\perp \notin M$ if decryption failed, and a proof $\pi_i$ that decryption was performed correctly with respect to the partial secret key $sk_i$ and the cipher-text c. In particular:

$$(d_i, \pi_i) \leftarrow PDec(sk_i, c)$$

d) TDec (threshold decryption): The algorithm TDec outputs the message m, or a special symbol $\perp \notin M$ if decryption failed, of the cipher-text c with respect to at least t partial decryption shares $d_i$. In particular:

$$m \leftarrow TDec(\{d_i\}_{0 < i \leq t})$$

e) The algorithm VfPDec (verify partial decryption) outputs a decision $d \in \{0,1\}$ on input $(pk_i, d_i, c, \pi_i)$ stating whether the decryption of c was performed correctly with respect to the partial secret key $sk_i$ (which corresponds to the partial public key $pk_i$) and the cipher-text c. In particular:

$$d \leftarrow VfPDec(pk_i, d_i, c, \pi_i)$$

In an exemplary embodiment, they comprise at least five algorithms. In particular, $$TENC := (TKeyGen, TEnc, PDec, VfPDec, PDec).$$

It is desirable that TENC is "sound" and "semantically secure". "Sound" in this context implies that a cipher-text c serves as a perfectly binding commitment and t decryption shares are adequate, while "semantically secure" implies that even if the adversary owns t−1 shares of the private key, it cannot derive any information about the plain-text.

Furthermore, it is desirable that TENC has a specific homomorphic property. It is therefore desirable to have a function $\oplus : C \times C \rightarrow C$ such that for all messages $(m_1, m_2) \in M^2$, $TEnc(pk_t, m_1) \oplus TEnc(pk_t, m_2)$ deciphers to $m_1 m_2$ if decrypted with PDec and TDec.

As a result of the requirement of isomorphic properties, a cipher-text may therefore be an element $\mathbb{G} \times \mathbb{G}$, where the subgroup $\mathbb{G}_p$ is isomorphic to $\mathbb{Z}_p$, and where a random oracle $G: \{0,1\}^* \rightarrow \mathbb{Z}_p \times \mathbb{Z}_p$, where cyclic group $\mathbb{G}$ is of the order of $q=2p+1$ (p being a prime number) and the generator g is of the order of p.

The embodiment shown in the FIG. 6 (for recovering the high entropy password) is analogous to that depicted in the FIG. 4 (where the high entropy password is generated) with the exception that instead of sharing RSA-key shares, the servers retrieve threshold decryption shares $d_i$ where each server signature $s_i$ is replaced by c", where c" is the cipher-text to be decrypted. A ciphertext is the result of encryption performed on plaintext using an algorithm, called a cipher. This embodiment involves a threshold encryption in dense cryptosystems. Dense in this context means, that (almost) every ciphertext has a corresponding plaintext. Threshold decryption implies that the decryption key is shared amongst several entities (in this event the several entities are the plurality of servers 130).

Only if a certain threshold number (t) of servers agree to proceed is the ciphertext decrypted. The user chooses a threshold number of servers t where t≤n, where n is the number of servers. In short, each server $S_i$ generates a decryption share $d_i$. Thus, the user 110 at registration generates a public key ($pk_t$) for the complete encryption scheme, but also generates key pairs ($sk_i, pk_i$) for the servers. Each server 130 then receives a public key ($pk_t$) and its own key pair ($sk_i, pk_i$), as this enables checking that a server has calculated the decryption shares correctly. It is to be noted that this scheme does not easily lend itself to attack by a hacker as the only the user knows the public key. Using these keys to corrupt the system would be of no use as the user would only be tricking himself.

The set-up is conducted as follows: the user chooses a threshold number of servers t where t≤n, where n is the number of servers.

The user in conjunction with the generating client generates $$(pk_t, \{(pk_i, sk_i)\}_{0 < i \leq n}) \leftarrow TKeyGen(1^\lambda, t, n)$$

For the first server 130a:

$$id, h_1 = H(k, PW, S_1), sk_1, pk_1, pk_t \quad (4),$$

while for the second server 130b, the hash algorithm may be represented as:

$$id, h_2 = H(k, PW, S_2), sk_2, pk_2, pk_t \quad (5),$$

and for the $n^{th}$ server 130n, the hash algorithm may be represented as:

$$id, h_n = H(k, PW, S_n), sk_n, pk_n, pk_t \quad (6).$$

The transmission of the initial data from the generating client 120 to the servers 130 for purposes or authentication and determining server secret data 340 may be conducted either sequentially or simultaneously. In an embodiment, the transmission between the generating client 120 and the servers 130 is conducted sequentially. After server 130a authenticates the transmission from the generating client 120, server 130b receives its transmission and authenticates it, and so on, until the $n^{th}$ server performs its authentication.

Server secret data 340 comprising one or more of $sk_i$, $pk_i$, $pk_t$ id, and $h_i$ for the user 110 is established for one or more of the n servers. The servers 130 for which server secret data is established may be referred to as secret holding servers. In FIGS. 3 and 4, step 340 is shown as covering the generating client 120 and the servers 130 because each may participate to various degrees, depending on the specific implementation, as will be described further below. If a specific implementation calls for the generating client 120 and servers 130 to exchange messages in order to establish server secret data 340, it is important that these messages be integrity protected and the source of each message be authenticated in order to maintain the security of the overall protocol. For example, the generating client and the servers 130 might exchange messages over a secure channel. At the end of step 340, each server 130 has access to its corresponding server secret data ($sk_i, pk_i, pk_t, id, h_i$) and typically will also securely store 345 it for future use in generating the high entropy password. Again (as detailed with respect to the FIG. 4), the user may want to store a share $pk_u$, $sk_u$ for himself. All values, except the id, k, and optionally the share $pk_u$, $sk_u$ need to be deleted from the recovery client 220. The non-deleted values can again be stored using a PASS-scheme, while all other values can (prior to deletion) be part of a backup (see Step 470 in the FIG. 5). It is to be noted that the use of an identity term "id" is not necessary, but using the identity term facilitates ease of computation.

All public keys (including for the RSA-case) are of course public and known to everyone—they can even be certified, and thus are not required to be stored outside this system. They may be added to the server secret data for readability. The user 110 receives the decryption shares and can merge the decryption shares to receive the plaintext. This plaintext will be the derived high entropy password.

For retrieving a ciphertext may be sampled via a hash-function G that maps into the domains of the ciphertexts. The input of the hash-function G is $m=(U_{id}, X)$, where X is a URL (uniform resource locator) for a website that uses the high entropy password and where $U_{id}$ relates to the login name.

With regard to the FIG. 6, user 110 in conjunction with the recovery client 220 inputs his password PW. The recovery client 220 also sets m=($U_{id}$,X), where X is the URL for the website that uses the high entropy password and where $U_{id}$ is the login password. It sets c=G(m). It then "blinds" this ciphertext, i.e., it sets c'=TEnc($pk_r$,1) (where TEnc is an encryption algorithm). Since the blinding of the ciphertext involves the use of randomness, c' will be different for each retrieval with a very high probability. In the homomorphic scheme let c"←c⊕c'. Since the scheme is homomorphic, multiplying with a ciphertext containing 1 does not change the decrypted value but essentially facilitates blinding the request. c' is the "blinding ciphertext" and c" is the "blinded ciphertext" and c is the "password ciphertext".

The user 110 in conjunction with the recovery client 220 generates $h_i$=H(c",H(k,PW;$S_i$)), and sends (id,hi,c") to server $S_i$.

The servers 130a through 130n look up the "id" and ensure that H($s_1$,$h_1$)=$h_1$'.

Then, each server $S_i$ sends back ($d_i$,$\pi_i$)←PDec($sk_i$,c") to the recovery client 220 (See Step 435 in the FIGS. 5 and 6). $\pi_i$ is a proof that $d_i$ was created correctly. In other words, each of the plurality of servers 130 has accomplished its part of the design. Then, the user having all ($d_i$,$\pi_i$), checks the correctness of each $\pi_i$ using the algorithm VfPDec($pk_i$,$d_i$,c", $\pi_i$). The user then combines t correctly generated to $d_i$ to the password using pw'←TDec($\{d_i\}_{0<i\le t}$).

The retrieval of the high entropy password can be summarized as follows:

a) the user 110 in conjunction with the recovery client 220 sets c=G(m) (where c is a ciphertext, G is a hash function and m is a message such that m∈M (where M is the message space and then "blinds" this ciphertext by setting c'=TEnc ($pk_r$,1). The user randomizes c"←c⊕c' in a homomorphic form. This randomization produces the requisite amount of blindness.

b) Each server 130 decrypts c" by applying its own decryption share ($d_i$,$\pi_i$)←PDec($sk_i$,c"). A random element always decrypts.

c) Each server 130 sends ($d_i$,$\pi_i$) to the user 110 and the recovery client 220.

d) The system 200 checks each $\pi_i$ using VfPDec, chooses t correctly computed $d_i$ and outputs TDec($\{d_i\}_{0<i\le t}$).

The scheme disclosed above for retrieval of the high entropy password may not use only a threshold structure. Other structures may also be used.

In yet another embodiment, passwords can be updated without the user having to store any information. This is an extension of the previous methods disclosed herein (using the RSA-key shares) and while only the interfaces are required, the various other embodiments can be changed if desired.

The protocol proceeds as follows: the password generated by the first protocol (using the RSA-key shares or the threshold scheme) is not used directly, but is used to decrypt a single index in a database which is stored, e.g., in the cloud. The user can therefore also update this database by passwords of his own choice.

A randomizable encryption scheme ENC=(EKGen,Enc, Dec,Rand) comprises four algorithms: a key generation algorithm K←EKGen($1^\lambda$) outputting a key K, an encryption algorithm C←Enc(K,d) computing a ciphertext C on input a key K, and data d, and a randomization algorithm C'←Rand(C), which randomizes the ciphertext, but leaves the plaintext untouched. The decryption algorithm Dec takes as input a secret key K, and a ciphertext C, and outputs either the decrypted data d or ⊥ if decryption failed.

Let H': $\{0,1\}^*\to$K be a hash-function, where K is the key space of ENC. The following protocol is then followed to update the passwords.

a) The first step is to set up the server as done in one of the aforementioned protocols.

b) For each service $s_i$, the user chooses a password $pw_i$.

c) The user obtains each password $pw_i'$, for the services using the aforementioned method.

d) The user encrypts each $pw_i$ using $pw_i'$ i.e., $C_i$←Enc(K ($pw_i'$),$pw_i$).

e) All $C_i$ can be stored publicly readable, e.g., in a cloud.

e) To retrieve a password $pw_i$, the user retrieves $pw_i'$, using the aforementioned protocol. The user then retrieves all $C_i$. It uses $pw_i'$ to decrypt the $i^{th}$ row, i.e., $pw_i$←Dec(K ($pw_i'$),$C_i$).

f) To update a record, the user retrieves the old $pw_i'$ using the aforementioned protocol.

g) The user then retrieves all $C_i$.

h) The user encrypts the new $pw_i$ using $pw_i'$ i.e., using $C_i$←Enc(K($pw_i'$),$pw_i$).

i) All other $C_i$ are randomized, i.e., $C_i'$←Rand($C_i$)

j) All $C_i$ are then stored at the cloud-provider again.

To improve efficiency, not all $C_i$ need to updated or retrieved.

This method is advantageous in that the online servers contribute to password "generation". The generated passwords are strong having high entropy values, and, in addition the servers do not learn the generated passwords and therefore a hacker penetrating the server will not get to know them either. The use of this method does not make use of any additional setup. Employing this method enables the user to avoid using a local key-ring and thus prevents the problems associated with using a key-ring, some of which are listed above. There is no longer a need for a single trusted entity and a relatively large number of passwords may be "stored" using the disclosed method.

A corrupted server cannot generate any passwords after a single setup as long as the threshold t≤n is not reached. The system permits the user to provide a plurality of auxiliary low entropy passwords that permit deriving a plurality of high entropy passwords for a plurality of different services and where the at least n servers do not learn the plurality of auxiliary passwords. The user can update the low entropy password and where none of the at least n servers learn which high entropy password was generated in a given password generating session. The system permits the at least n servers to stop contributing to high entropy password generation when a low entropy password is wrongly entered at least three times. As will be detailed, the system further comprises a recovery client that contributes to password generation, and where the recovery client authenticates itself towards the at least n servers to avoid flooding the at least n servers with false login attempts. The recovery client authenticates itself using and identity "id" towards the servers to avoid flooding the server with false login attempts. The user can "shutdown" the servers using out-of-band means, e.g., by telephone. Of course, the vice versa is also be possible.

The generating client stores additional authentication information. The servers save the secret server data. The user can save a first set of authentication data. The user can backup the generated data onto a secure backup, e.g., one that is not connected to the internet to have a disaster recovery. The secret server data is generated in a distributed fashion using standard multi-party computation techniques in a manner such that no involved entity has at any point in time enough information to restore all secrets of the servers. The authentication used by the recovery client is generated in a distributed fashion using, for example, multi-party computation (MPC) techniques.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method for retrieving a high entropy password from a system including a recovery client computer and one or more server computers, the method comprising:

preparing to retrieve the high entropy password in utilizing the recover client computer and at least one of the one or more server computers by:

choosing, by at least one of the recovery client computer and at least one of the one or more server computers, a threshold t≤n, where t and n represent a number of server computers;

retrieving the high entropy password in utilizing the recover client computer and at least one of the one or more server computers by:

running, by at least one of the recovery client computer and at least one of the one or more server computers, $(pk_t;\{(pk_i,sk_i)\}_{0<i\leq n}) \leftarrow TKeyGen(1^\lambda,t,n)$, from the recovery client computer to the one or more server computers; where $pk_t$ is a public key, $pk_i$ is a public key and $sk_i$ is a secret key, where TKeyGen is an algorithm that outputs the public ($pk_t$) and the public ($pk_i$) key for each participant and the secret key ($sk_i$) of a scheme, where λ is a security parameter n∈N a number of participants, t≤n∈N is a threshold given by:

$$(pk_t;\{(pk_i,sk_i)\}_{0<i\leq n}) \leftarrow TKeyGen(1^\lambda,t,n);$$

dividing, by at least one of the recovery client computer and at least one of the one or more server computers, $pk_t$, $pk_i$, and $sk_i$ arbitrarily among the one or more server computers; where each server computer receives a share of $pk_t$, $pk_i$, and $sk_i$;

setting, by at least one of the recovery client computer and at least one of the one or more server computers, c=G(m), where c is password ciphertext, G is a hash function and m is a message;

blinding, by at least one of the recovery client computer and at least one of the one or more server computers, ciphertext c where setting c'=TEnc($pk_t$,1), where algorithm TEnc gets as input the public key $pk_t$, a message m∈M to encrypt, where m and M are both messages; and outputs a cipher-text c: c←TEnc($pk_t$, m);

randomizing, by at least one of the recovery client computer and at least one of the one or more server computers, c"←c⊕c' in a homomorphic form;

decrypting, by at least one of the recovery client computer and at least one of the one or more server computers, c" by applying a decryption share $(d_i,\pi_i)$←PDec($sk_i$,c"), where c' is the blinding ciphertext and c" is the blinded ciphertext, where algorithm PDec outputs a decryption share $d_i$, or a special symbol ⊥∉M if decryption failed, a proof $\pi_i$ that decryption was performed correctly with respect to a partial secret key $sk_i$ and the cipher-text c:

$$(d_i,\pi_i) \leftarrow PDec(sk_i,c);$$

sharing the high entropy password in utilizing the recover client computer and at least one of the one or more server computers by:

sending, by at least one of the one or more server computers, $(d_i,\pi_i)$ from a server computer to the recovery client computer, wherein the high entropy password is generated based on $(d_i,\pi_i)$ and provided to a user.

2. The method of claim 1, where the retrieving further includes utilizing two further algorithms namely algorithm TDec that outputs a message m, or the special symbol ⊥∉M if decryption of the cipher-text c failed with respect to at least t partial decryption shares $d_i$ such that:

$$m \leftarrow PDec(\{d_i\}_{0<i\leq t}), \text{ and}$$

algorithm VfPDec that outputs a decision d∈{0,1} on input $(pk_i,d_i,c,\pi^i)$ stating whether the decryption of the cipher-text c was performed correctly with respect to the partial secret key $sk_i$ and the cipher-text c such that:

$$d \leftarrow VfPDec(pk_i,d_i,c,\pi_i).$$

3. The method of claim 2, where the system checks each $\pi_i$ using VfPDec, chooses t correctly computed $d_i$ and outputs TDec($\{d_i\}_{0<i\leq t}$), to the user, which is the high-entropy password to a generating client and/or the recovery client computer.

4. The method of claim 1, where n≥1 if the user takes a key pair-share.

5. The method of claim 1, where n is that or equal to 2, when the user does not take a share.

6. The method of claim 1, further comprising setting m=(Uid$_i$,X) where X is a uniform resource locator for a website that uses the high entropy password and Uid$_i$ is a login password and where a function of m is transmitted from the recovery client computer to the one or more server computers.

* * * * *